(12) United States Patent
Williams et al.

(10) Patent No.: US 6,740,234 B1
(45) Date of Patent: May 25, 2004

(54) KEY TRACK SYSTEM

(75) Inventors: Michael J. Williams, Glastonbury, CT (US); Thomas M. Tornatore, Enfield, CT (US); Leon P. Janik, Suffield, CT (US)

(73) Assignee: Stanadyne Corporation, Windsor, CT (US)

(*) Notice: Subject to any disclaimer, the term of this patent is extended or adjusted under 35 U.S.C. 154(b) by 269 days.

(21) Appl. No.: 10/090,921

(22) Filed: Mar. 5, 2002

(51) Int. Cl.[7] .......................... B01D 35/30; B01D 27/08
(52) U.S. Cl. .................... 210/232; 210/233; 210/249; 210/444
(58) Field of Search ............................. 210/232, 233, 210/249, 444

(56) References Cited

U.S. PATENT DOCUMENTS 6,001,249 A * 12/1999 Bailey et al. ............... 210/232
6,187,188 B1 * 2/2001 Janik et al. ................. 210/232
6,500,335 B2 * 12/2002 Janik et al. ................. 210/232

FOREIGN PATENT DOCUMENTS

WO     WO 02/13944 A2 *  2/2002

* cited by examiner

Primary Examiner—Thomas M. Lithgow
(74) Attorney, Agent, or Firm—Alix, Yale & Ristas, LLP

(57) ABSTRACT

A key track system for a filter base module comprises a ring-shaped fixture including a series of perforations, each perforation at least partially defining a parting line along which a tab may be selectively removed. The key track fixture is incorporated into the filter base module to define the periphery of an entryway to a cartridge-receiving receptacle in the header portion of a base module. In some embodiments, the key track fixture is a molded ring-like component with pre-key selected angularly spaced key slots. Base modules including the key track system may be efficiently configured to accept the key pattern of a filter cartridge compatible with the filter system in which the base module will be used.

13 Claims, 8 Drawing Sheets

KEY TRACK SYSTEM

BACKGROUND OF THE INVENTION

This invention relates generally to fuel filters employed in connection with internal combustion engines. More particularly, the present invention relates to fuel filter systems having a replaceable cartridge for removing foreign particles and/or separating water from fuel of the fuel supply system of an internal combustion engine.

A number of conventional fuel filter systems perform the dual functions of removing particulate matter from the diesel fuel and separating water from the fuel. Conventionally, the fuel filter systems employ a disposable filter cartridge which is replaced at pre-established intervals of filter usage. In practice the filter cartridge requirements may vary depending upon such characteristics as the type and make of the internal combustion engine, the specific applications for which the engine is employed, the climate in which the combustion engine is operated and/or regional characteristics as to the quality of the fuel supply. The filter cartridges thus commonly vary as to their internal dimensions, their capacity, and the qualities of their filter media.

One of the problems which is frequently encountered in connection with replacement of the filter cartridge is ensuring that the replaced cartridge is compatible with the filtering requirements for the fuel system. Because numerous types and qualities of filter cartridges may dimensionally conform to the base of a given filter system, the replacement filter cartridge frequently does not comply with the specifications for the filter system, thereby jeopardizing the integrity of the fuel filtering system. Use of an incompatible filter cartridge can have very serious effects on the operation of the internal combustion engine, and may also be unnecessarily expensive when a less costly cartridge is fully suitable. Frequently, either the owner or the maintenance personnel servicing the internal combustion engine are totally unaware of the replacement filter cartridge specifications and requirements and unknowingly jeopardize the integrity of the filtering system by using non-conforming filter cartridges. There are also instances where inferior or improper replacement filter cartridges are intentionally installed without the knowledge of the owner or operator of the vehicle.

U.S. Pat. No. 5,035,797, which is assigned to the assignee of the present invention, discloses a key system for a filter system intended to address issues of filter cartridge compatibility. Fuel filter systems commonly comprise fuel inlet and outlets disposed in a base and a disposable filter cartridge which mounts to the base. Disposable filter cartridges constructed according to this invention have slots which are designed to mate with axial projections of the base. The projections obstruct the use of an incompatible cartridge by interfering with the mounting and sealing of the cartridge to the base. An alternative key system includes keys radially projecting from the communication end of a filter cartridge. The radial projections interfere with the reception of the filter cartridge in the base module. While these systems work well, they frequently require the manufacturer to design and manufacture a new base module for use with each differently keyed filter cartridge.

One aspect of filter system design and manufacture which tends to increase costs is the necessity of designing and manufacturing multiple variations of a given filter system to meet the headroom, flow, filtration and other requirements of particular applications. Filter base modules manufactured for a particular application frequently have an external configuration and/or internal key structures which make them useless for other applications. For example, U.S. patent application Ser. No. 09/785,785, filed Feb. 17, 2001 and which is assigned to the assignee of the present invention, discloses a Multi-Configurable Filter Base Module which illustrates an attempt to address this issue.

The multi-configurable filter base module uses a few standardized molded parts to create a wide variety of base module configurations. The multi-configurable filter base module is primarily directed to the external configuration of the base module, i.e., the configuration of the fuel inlet and outlet connectors and the mounting brackets on the outside of the filter base module. However, even a multi-configurable filter base module may have an internal structure keyed to accept only a particular filter cartridge and cannot be used for applications requiring a differently keyed filter cartridge.

SUMMARY OF THE INVENTION

Briefly stated, the invention in one preferred form comprises a key track system which may be incorporated into a filter base module and later efficiently configured to accept the key pattern of a filter cartridge appropriate to the end use.

Filter base modules, which are typically molded plastic or cast metal units, include a header portion which defines a receptacle for receiving the communication end of a filter cartridge and may include a lip structure for retaining a received cartridge. In an alternative retaining system, a retainer ring is threaded to the base module and engages a circumferential roll seam shoulder of the filter cartridge to retain the cartridge to the base module. When properly received in a base module, the communication end of a filter cartridge fills the header portion of the base module and receives the fuel inlet/outlet conduits projecting from the base module.

The present invention is directed to a key track fixture which may be molded or otherwise incorporated into a base module. One preferred form of the key track fixture is a flat metal ring including a plurality of angularly spaced perforations at least partially defining a series of parting lines for tabs which project radially outwardly from the interior edge of the ring. The key track fixture is mounted within the base module in such a manner that it defines the periphery of an entryway to the receptacle of the header portion. The configuration of this entryway may be altered by selective removal of tabs.

When the manufacturer wishes to create a filter system utilizing a filter cartridge having a particular communication end key configuration, the appropriate tabs are punched, or otherwise removed from the key track fixture retained in a base module. Thus, a generic base module may be efficiently configured to receive only a properly keyed filter cartridge. A key track fixture in accordance with the present invention, when combined with the use of interchangeable components, allows the manufacturer to create filter base modules having the desired external and internal configuration without having to design or manufacture new components.

In another embodiment of the invention, the key track fixture is in the form of a molded ring-like component which is ultrasonically welded in place. The inner edge of the fixture is defined by a plurality of angularly spaced keyway slots which are disposed at selected angular orientations which correspond to the keys at the communication end of the cartridge. The absence or presence of a slot at certain angular positions corresponds also to various characteristics of the filter cartridge such as water separating features, filter porosity and the customer model and other identification information for a given cartridge. The molded ring prior to installation may have one or more exterior notches so that the component may be suitably, angularly aligned with the rest of the header portion. In addition, a rim is provided to facilitate ultrasonic bonding of the molded component.

An object of the invention is to provide a new and improved key track system which provides for the efficient and cost effective production of generic filter base module components which may be efficiently configured to accept the key pattern of filter cartridges compatible with the requirements of the filter system.

Another object of the invention is to provide a new and improved key track system which allows the production of internally keyed filter base modules from a limited set of pre-fabricated components.

Other objects and advantages of the invention will become apparent from the specification and the drawings.

DETAILED DESCRIPTION OF THE PREFERRED EMBODIMENTS

With reference to the drawings wherein like numerals represent like parts throughout the figures, a key track fixture in accordance with the present invention is designated by the numeral 10.

Figure 6:
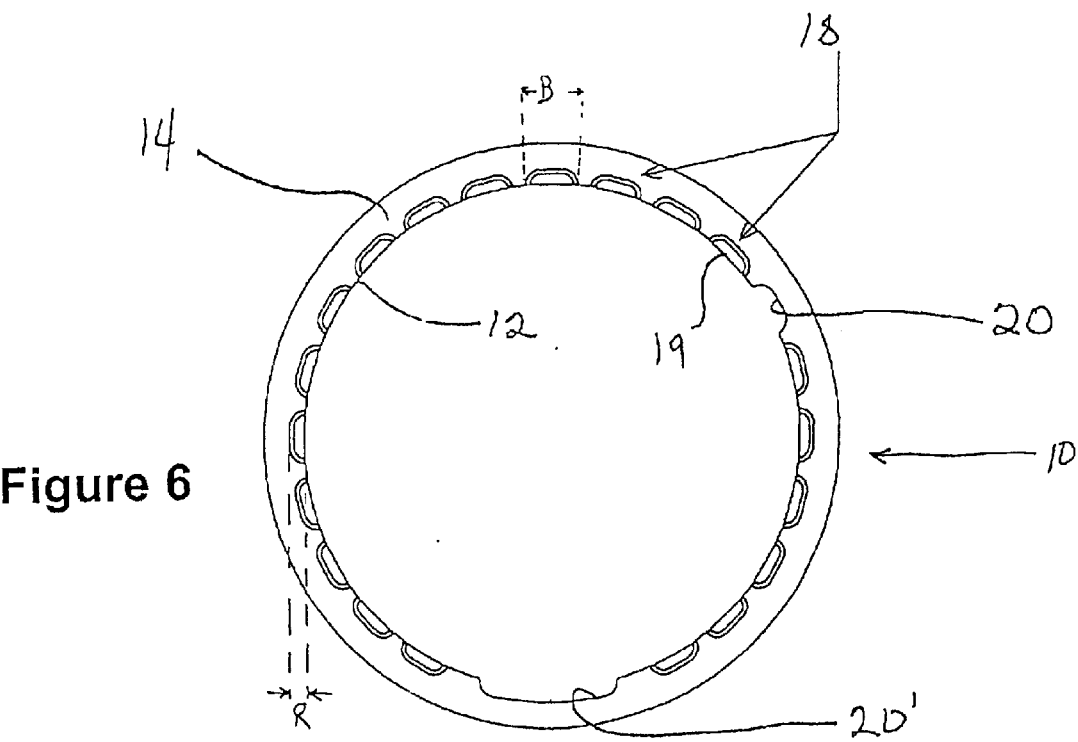
FIG. 6 is a top plan view of a first embodiment of a key track fixture in accordance with the present invention.
Figure 7:
FIG. 7 is a side view (partly in phantom) of the key track fixture of FIG. 6.
Figure 8:
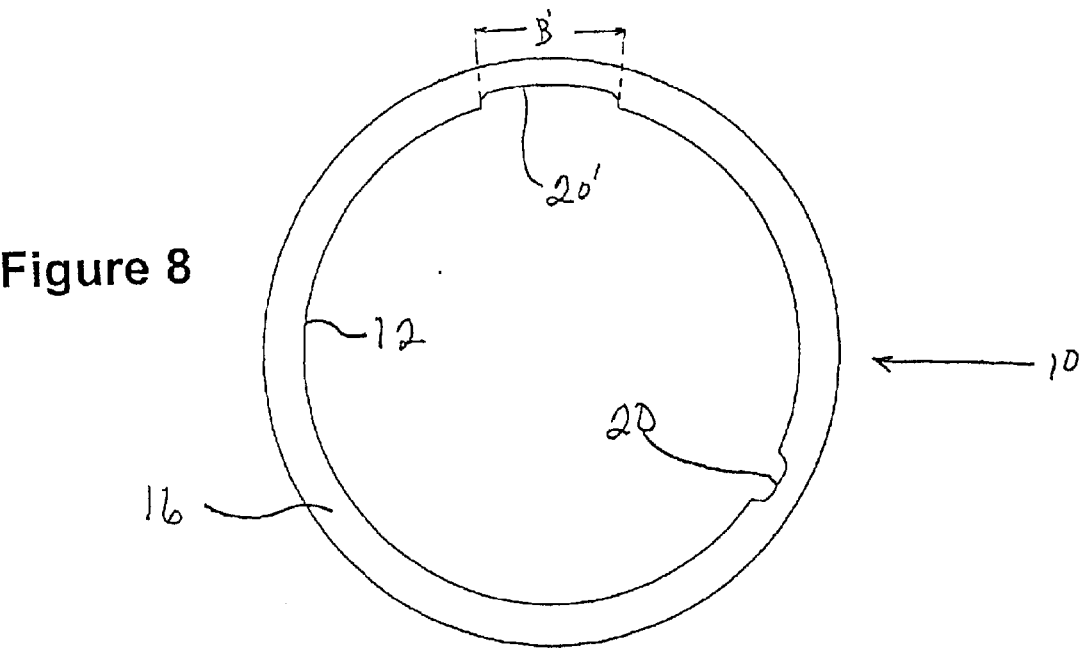
FIG. 8 is a bottom plan view of the key track fixture of FIG. 8.

A preferred embodiment of the key track fixture 10 is illustrated in FIGS. 6–8. In the illustrated embodiment, the key track fixture 10 is preferably a plastic ring having a top surface 14, a bottom surface 16 and an interior edge 12. The key track fixture 10 includes a series of perforations 18 which at least partially define parting lines for notch-shaped tabs 19. The perforations 18 extend most of the way through the track material from the top surface 14 (FIG. 6) toward the bottom surface 16 (FIG. 8). While the tabs 19 are relatively easily removed, sufficient material is left to support the tabs 19 firmly in place. The tabs 19 extend radially outwardly from the interior edge 12 of the key track 10. Each tab 19 may be removed to form an axial slot or keyway 20 through the key track 10.

Each tab 19 has an angular component β and a radial extent R. In the illustrated embodiment, the perforations 18 define tabs 19 having equiangular components β, equiangular spacing and equal radial extents R. The illustrated embodiment of the key track fixture 10 also includes a pre-formed keyway 20' angularly spaced from the series of tabs 19 and having a different angular component β' than the tabs 19. A pre-formed keyway, such as 20', may be used to align a tool used to configure the key track fixture 10. Such a pre-formed keyway may also be useful to identify groups or species of filters, with particular filters within the group having additional key(s) complementary to one or more tabs.

A bottom view of the key track fixture 10 illustrates the interior edge 12 and keyways 20 and 20'. The perforations 18 are not visible from the open first end 37 of the header portion 33. Removal of a tab 19 results in an axial keyway 20 having an angular component β and radial extent R equal to that of the removed tab.

Figure 1:
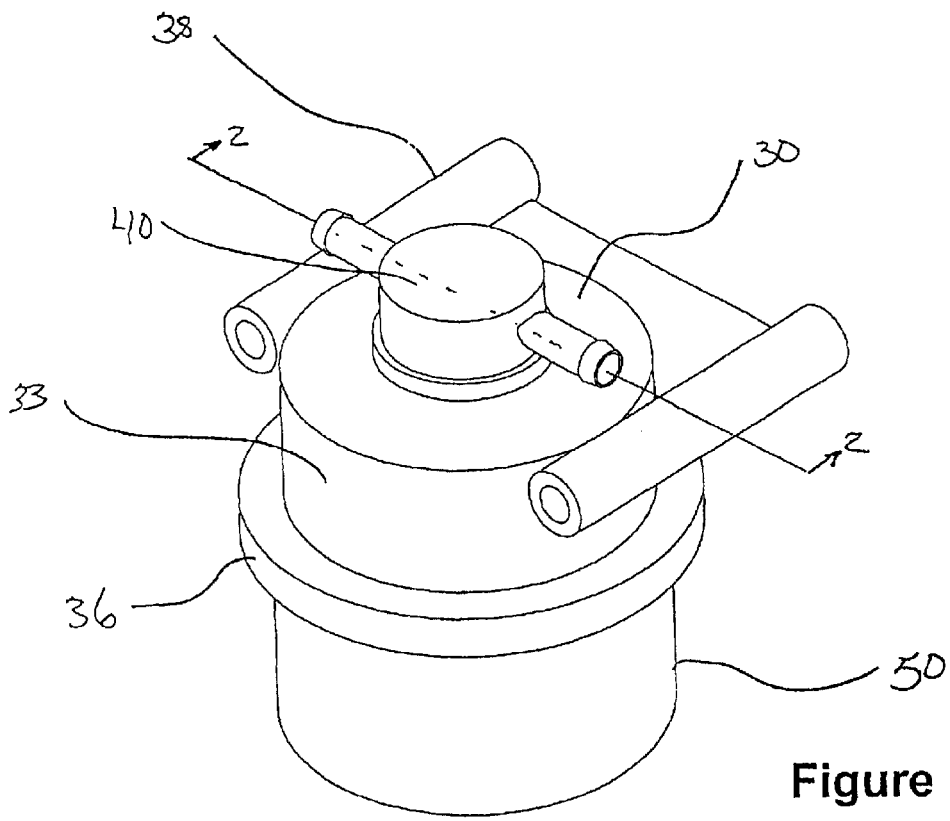
FIG. 1 is a perspective view of a filter system including a base module and received filter cartridge wherein the base module incorporates a key track system in accordance with the present invention.

FIG. 1 illustrates a typical filter system incorporating the key track system. A base module 30 includes a header portion 33 which defines a receptacle 32 for receiving a filter cartridge 50. A communication module 40 provides fluid inlet and outlet fittings 42, 44 to the base module 30 and includes an inlet conduit 28 which projects axially into the receptacle 32 defined by the header portion 33. A bracket 38 integrally extends from the header portion 33 for mounting the base module to a mounting structure in the vehicle (not illustrated). A retaining lip structure 36 integrally extends from the first end 37 of the header portion 33.

Figure 2:
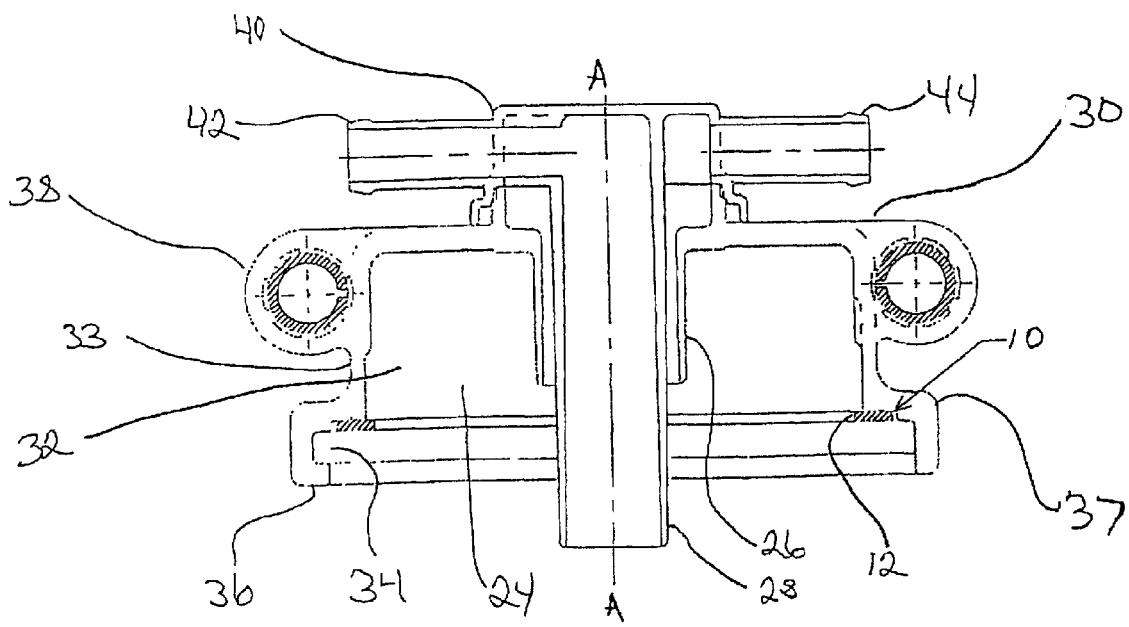
FIG. 2 is a cross sectional view of the base module of FIG. 1, taken along line 2—2 thereof.
Figure 3:
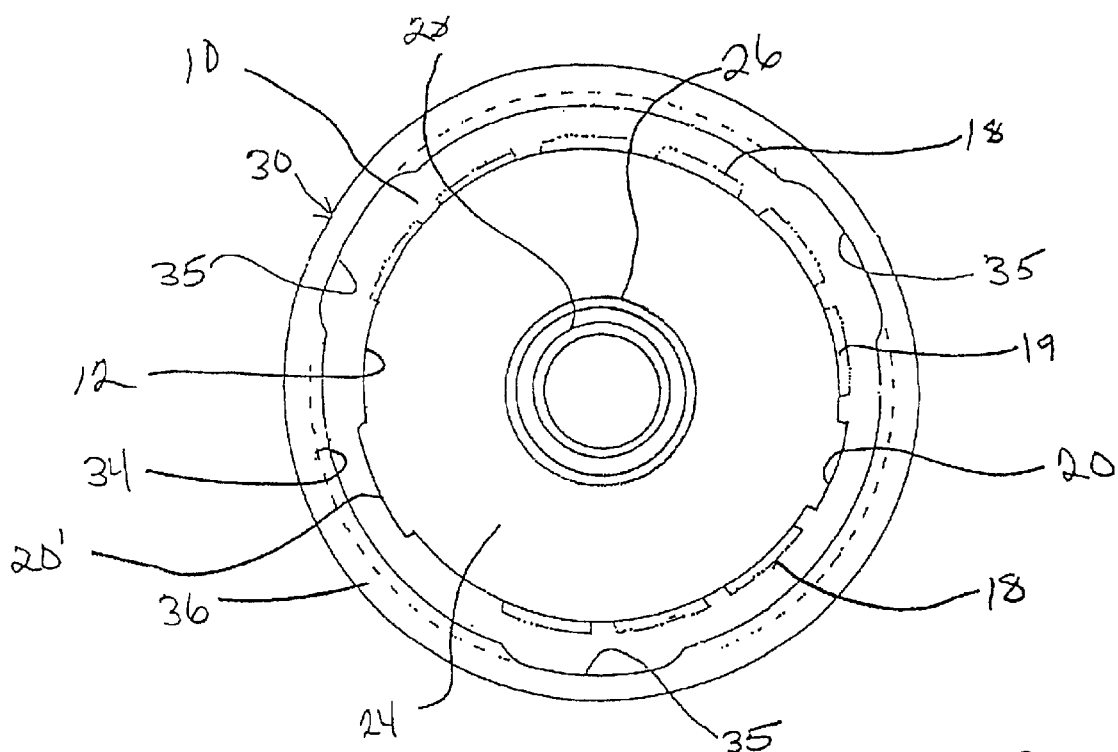
FIG. 3 is a bottom plan view of the base module of FIG. 2.
Figure 5:
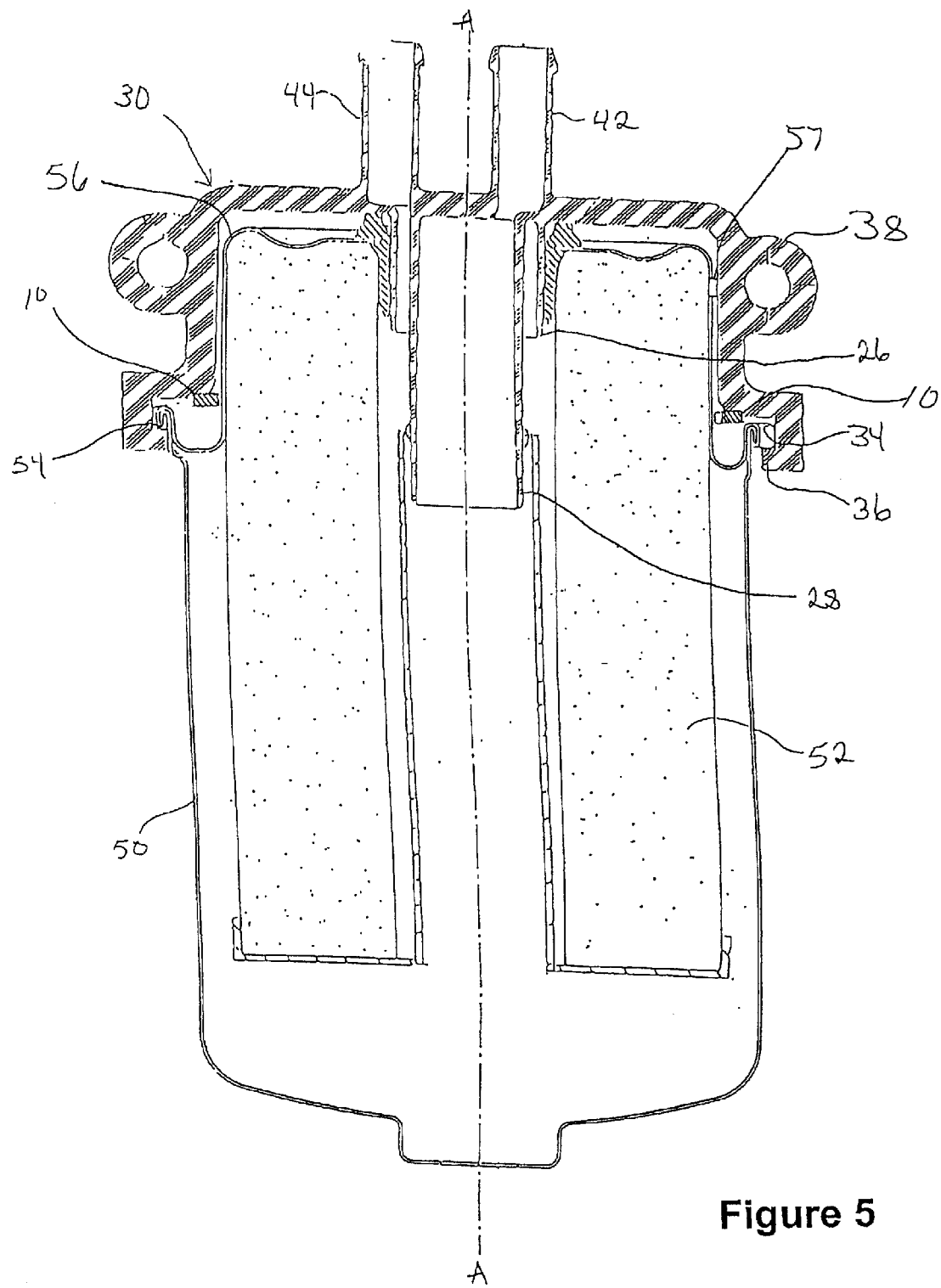
FIG. 5 is a central sectional view of a base module and received filter cartridge wherein the base module incorporates a key track system in accordance with the present invention.

The key track fixture 10 is installed at the first end 37 of the header portion 33 where it defines the periphery of an entryway 24 to the receptacle 32 (FIGS. 2 and 3). The receptacle 32 is a generally cylindrical space, symmetric around a central axis A, which is configured to receive the communication end 56 of a filter cartridge 50. FIG. 5 illustrates one possible configuration of base module 30 and received filter cartridge 50. The filter cartridge 50 is typically a metal canister containing a filter element 52 and structures for engaging and sealing to the received inlet 28 and outlet 26 conduits. The cartridge 50 has at least one key 57 radially extending from the communication end 56. To be received in the base module 30, the communication end 56 of the filter cartridge 50 must pass through the entryway 24 the periphery of which is defined by the key track fixture 10. The key track fixture 10 will not allow the communication end 56 to pass through the entryway 24 unless the entryway is configured to accommodate the radial projection of the key 57.

Figure 4:
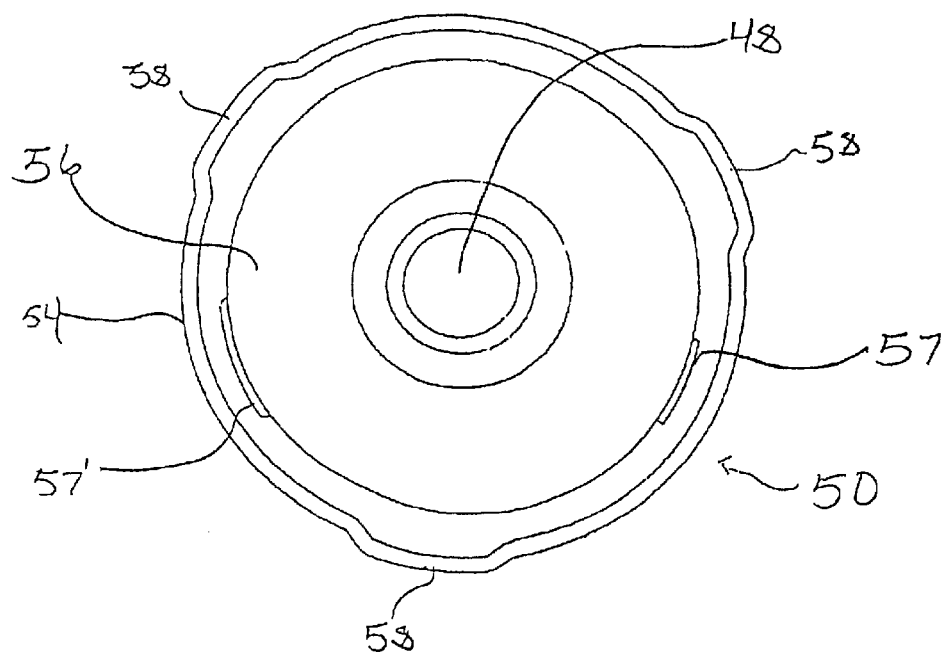
FIG. 4 is a top plan view of the filter cartridge of FIG. 1.

As illustrated in FIG. 3, the key track fixture 10 defines the configuration of the periphery of an entryway 24 to the receptacle 32. FIG. 4 is a top plan view of a filter cartridge 50 having a communication end 56 configured to be compatible with the entryway 24 illustrated in FIG. 3. Radially extending keys 57, 57' alter the periphery of the communication end 56 and require corresponding keyways 20 and 20' to be opened in the interior edge 12 of the key track 10. Keyway 20 is formed by removing one of the series of tabs 19.

FIGS. 3 and 4 also illustrate the complementary structures comprising one possible system for retaining the filter cartridge 50 in mated position with the base module 30. A retaining lip 36 integrally extends from the header portion 33 and forms an interior circumferential channel 34. The lip 36 preferably defines a plurality of equiangularly spaced axial slots 35. These slots mate with corresponding radially protruding tabs 58 of the cartridge 50 to facilitate axial reception upon angular alignment thereof and insertion into the receptacle 32 defined by the header portion 33. The cartridge 50 is then rotated so that the tabs 58 are retained in the circumferential channel 34.

Figure 9:
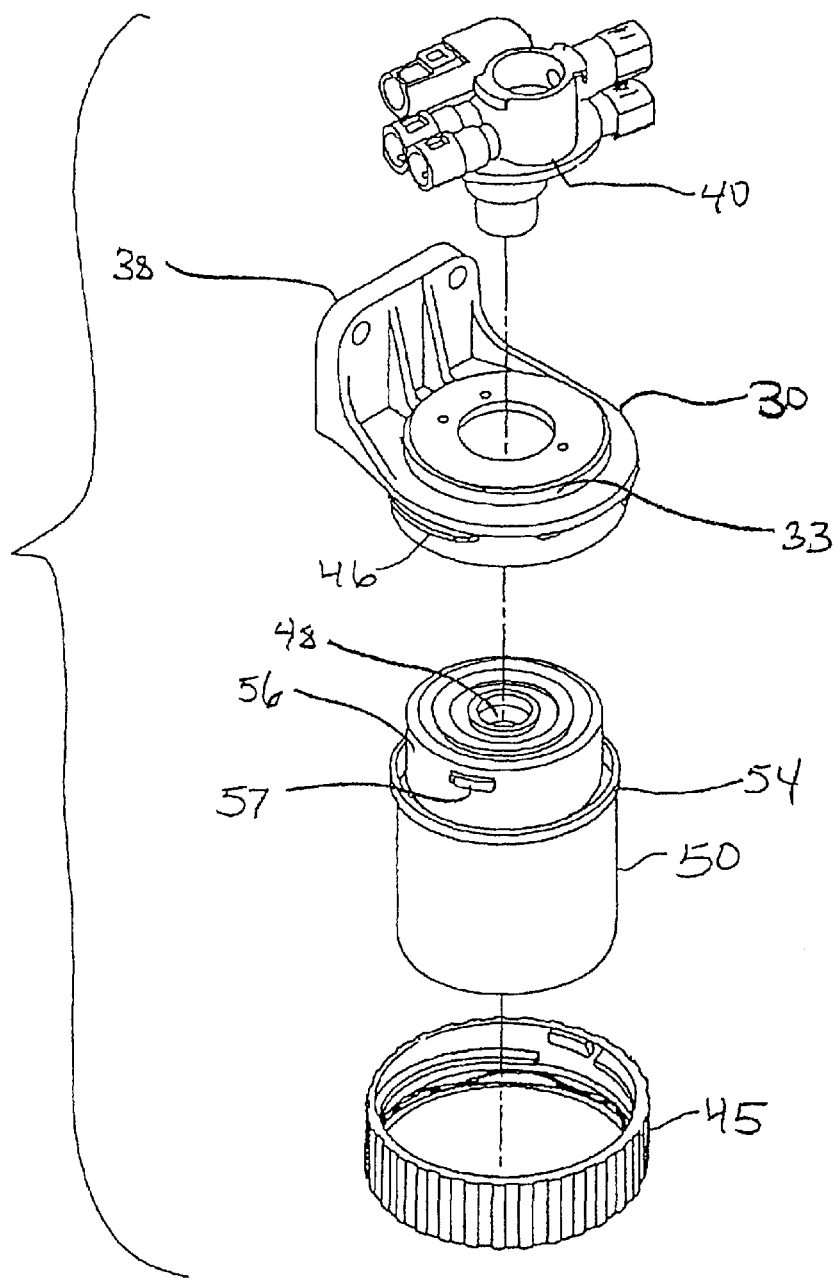
FIG. 9 is a perspective view of an alternative embodiment of a filter system incorporating a key track system in accordance with the present invention.

A filter system utilizing an alternative cartridge retention system is illustrated in FIG. 9. This retention system utilizes a threaded collar 45 which passes over the filter cartridge 50 to engage a circumferential roll seam 54. The header portion 33 of the base module 30 includes an externally threaded portion 46 integrally extending from the header portion 33. The collar 45 engages the threaded portion 46 and retains the filter cartridge 50 in a mated position to the base module. In all respects pertinent to the configuration of the communication end 56 of the filter cartridge 50, and the location and function of the key track 10 within the header portion 33, the alternative filter systems function similarly.

Figure 10:
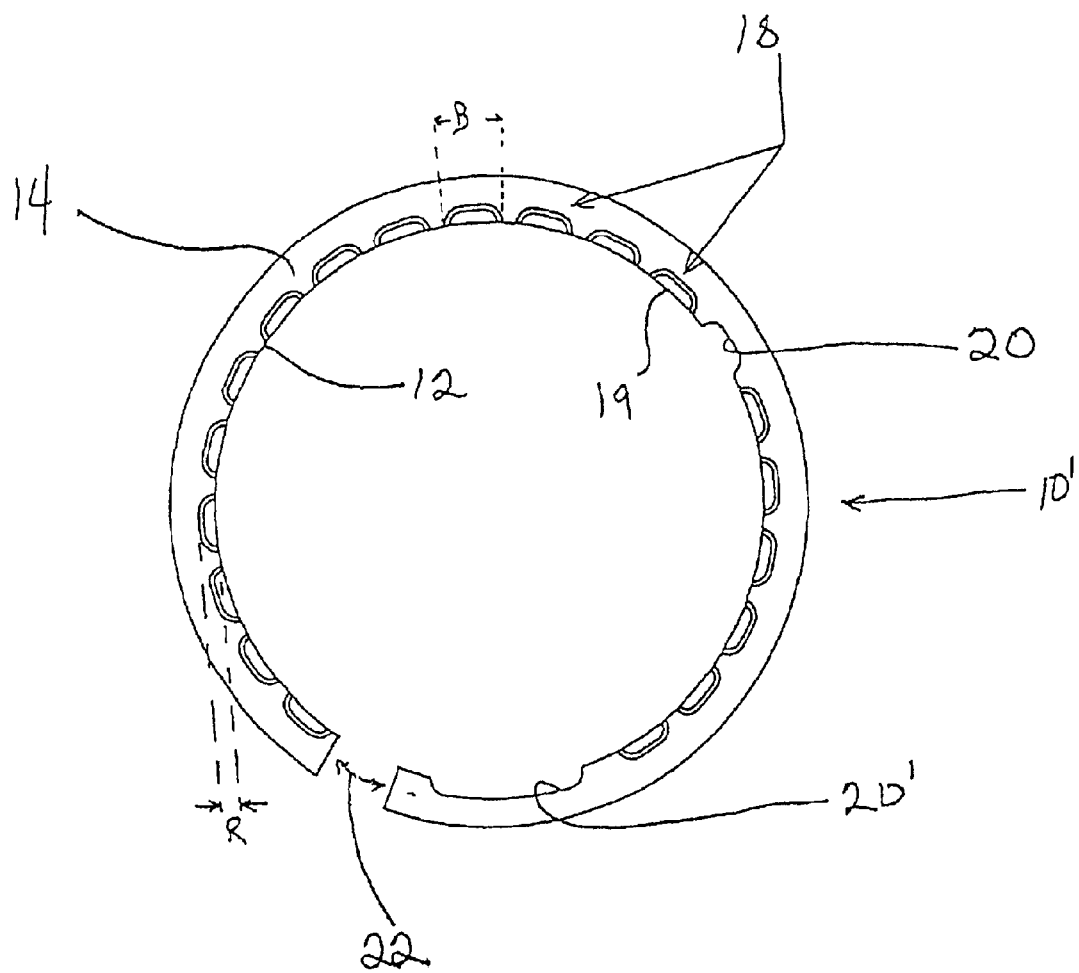
FIG. 10 is a top plan view of a second embodiment of a key track fixture in accordance with the present invention.
Figure 11:
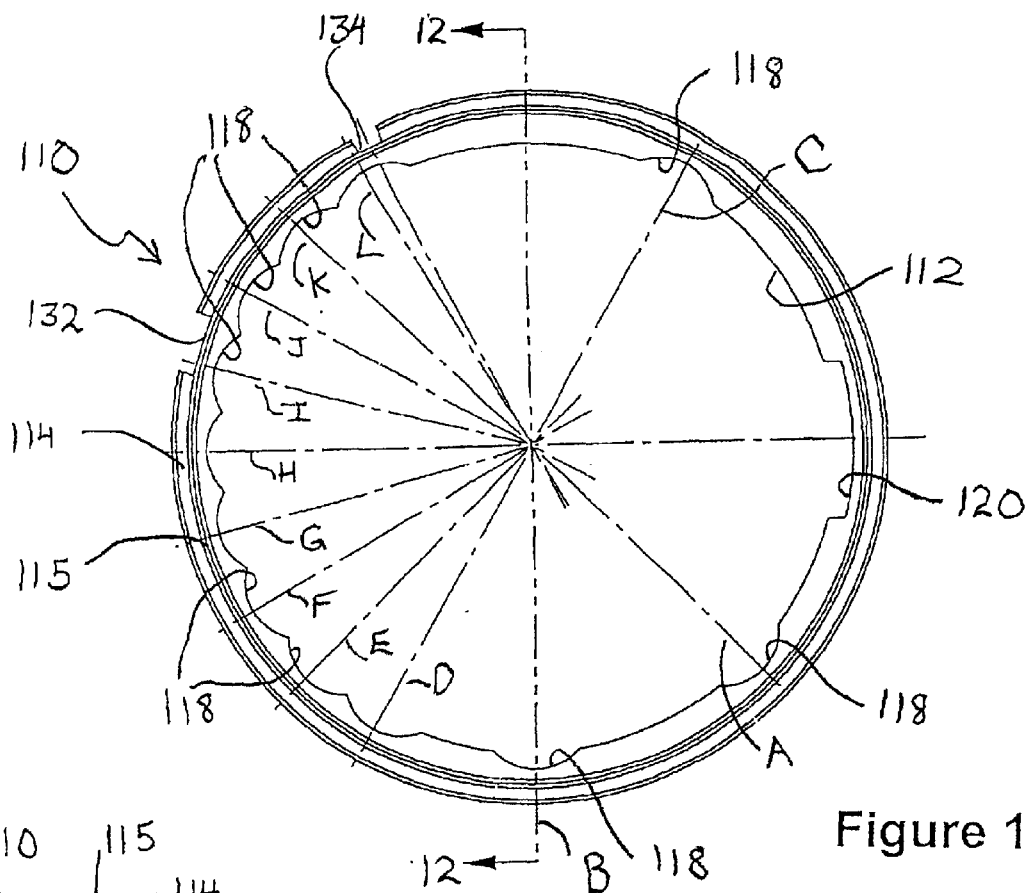
FIG. 11 is a top plan view, partly in schematic, of a composite representation of a third embodiment of a key track fixture in accordance with the present invention.
Figure 12:
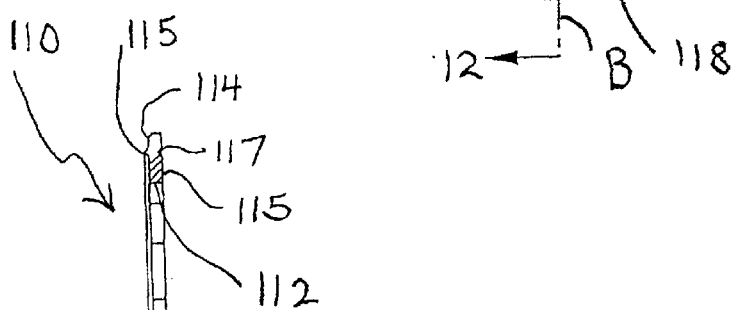
FIG. 12 is a side sectional view of the key track fixture of FIG. 11, taken along the lines of 12—12 thereof.
Figure 13:
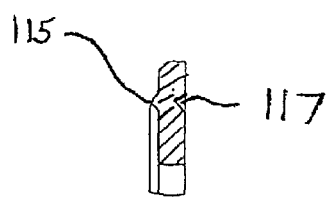
FIG. 13 is an enlarged fragmentary sectional view of the key track fixture of FIG. 12.

FIG. 10 illustrates an alternative embodiment of the key track fixture designated by the numeral 10'. The alternative embodiment 10' is similar in all respects to the key track fixture illustrated in FIGS. 6–8 except that this embodiment is in the form of a split ring. The alternative embodiment incorporates a space 22 which allows the fixture 10' to be compressed and inserted into an internal groove in a base module receptacle 32. This form of key track fixture 10' allows the base module 30 to be molded or cast independently of the key track fixture 10'. The key track fixture 10' may be configured prior to insertion into the base module. Being able to configure the key track fixture 10' prior to insertion makes the configuration process more efficient. In addition, a broken or misconfigured key track fixture may be removed and replaced.

Figure 14:
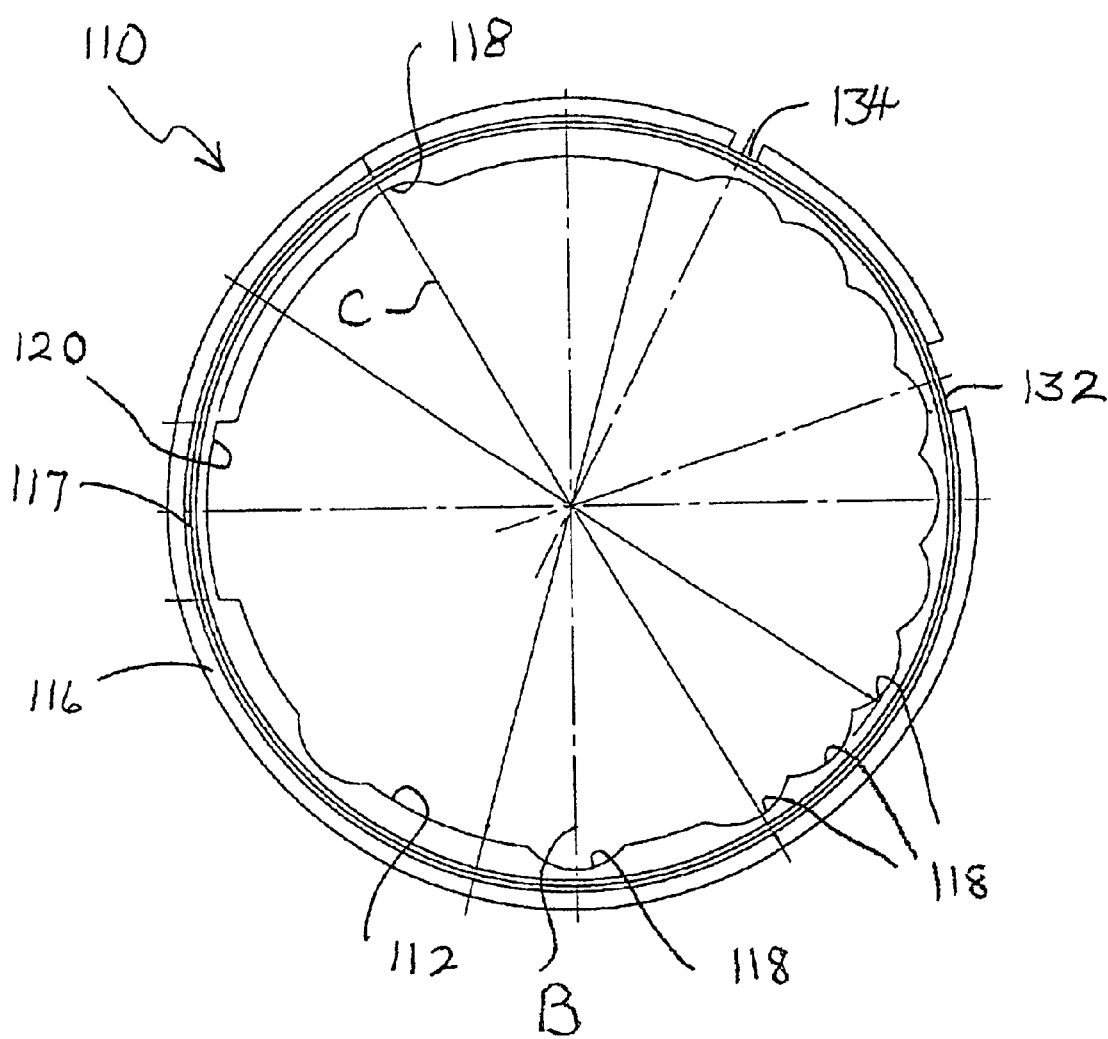
FIG. 14 is a bottom plan view, partly in schematic, of a composite representation of the key track fixture of FIG. 11.

With reference to FIGS. 11–14, another embodiment of key track fixture which represents a composite of all possible key slot possibilities is designated by the numeral 110. Fixture 110 may preferably be formed of 33% glass filled nylon and can be suitably configured by molding to provide embossment slots as desired. The ring includes a top surface 114 having a rim 115 and an opposite bottom surface 116 with a complementary circumferential groove 117. The key track fixture 110 includes an interior edge 112. A series of angularly shaped key slots 118 extend radially outwardly from the interior edge. The slots 118 are selectively defined by the track material to extend from the top surface 114 (FIG. 12) to the bottom surface 116 (FIG. 14). It should be appreciated that a given fixture will typically only include a few selected slots 118. The ring also preferably includes a principal embossment slot 120.

At the exterior edge of the ring at the outside diameter thereof are a pair of notches 132 and 134 to locate the fixture 110 relative to the header and the selected position of the received cartridge. The fixture is preferably ultrasonically welded in place and the rim 115 facilitates the welding process. The groove 117 facilitates stacking of the fixtures.

It should be appreciated that various angular positions of the embossment slots 118 may identify various features and characteristics for the associated cartridge. For example, the absence or presence of a slot at angle A may correspond to a given type of water separator, the absence or presence of a slot at angles B and C may correspond to the filter porosity. The presence or absence of other slots at angles D–L may correspond to specific customer and customer model designations.

While many systems have been suggested for the keying of filter cartridges to base modules in filter systems to ensure replacement integrity and compatibility, there are particular advantages to the key track system of the present invention. The key track system allows for the production of universal base modules having similar mounting structures and similar retention structures, such as employing either a lip or a collar. To ensure filter cartridge compatibility using the key track system of the present invention, the only portion of a filter cartridge that must be unique, i.e., complementary configured, is the communication end. In all other respects, filter cartridges may have the same size, shape and configuration, thereby reducing the cost of production.

For some embodiments, a base module containing a key track fixture may be configured after manufacture to receive only the key pattern of a filter cartridge appropriate for the desired application. Relatively simple tools may be used to remove tabs in a key track fixture to configure a given base module. The selected configuration may be implemented by the manufacturer of filter systems upon receipt of an order or may be part of the assembly or installation process by the end user. Once configured or installed, a base module according to the present invention will accept only appropriately keyed filter cartridges, thus ensuring the integrity of the filter system. The perforations are not visible to the shop technician or consumer, making later mis-configuration of the key track difficult and unlikely to be successful.

While preferred embodiments of the foregoing invention have been set forth for purposes of illustration, the foregoing description should not be deemed a limitation of the invention therein. Accordingly, various modifications, adaptations to one skilled in the art without departing from the spirit invention.

What is claimed is:

1. A filter base module comprising:

a header portion defining a receptacle having an axis for receiving a communication end of a filter cartridge, and a key track fixture mountable to said header portion for disposal about said axis and including a plurality of angularly spaced perforations, and an interior edge at least partially defining an entryway to said header portion, each said perforation at least partially defining a parting line for a notch-shaped tab having an angular component and a radially outward extent from said interior edge, wherein at least one said tab may be separated from said key track fixture to define a selectively configured entryway to said header portion.

2. The filter base module of claim 1, wherein said key track fixture comprises a flat ring having a top surface and a bottom surface, said perforations extending from said top surface toward said bottom surface and said key track fixture is mounted within said base module with said bottom surface facing axially away from said header portion and said top surface facing axially toward said header portion.

3. The filter base module of claim 2, wherein said base module is a molded plastic component and said key track fixture is captured and held within said molded plastic.

4. The filter base module of claim 1, wherein each tab is angularly spaced a substantially equal distance from the other tabs.

5. The filter base module of claim 1, wherein each said tab has a substantially identical angular component and extends a substantially identical radial distance.

6. The filter base module of claim 1, wherein at least one tab extends a radial distance which is different from the corresponding radial extent of another tab.

7. The filter base module of claim 1, wherein at least one tab has an angular component which is different from the corresponding angular component of another tab.

8. The filter base module of claim 1, wherein the angular spacing of at least one tab is different from the corresponding angular spacing of another tab.

9. The filter base module of claim 2, wherein the ring has a plastic composition.

10. A filter system comprising:

a filter cartridge having a communication end including an exterior surface with at least one radially extending key, and a base module including a header portion which defines a receptacle having an axis, said receptacle configured to receive the communication end of said cartridge and a key track fixture having an interior edge which at least partially defines the periphery of an entryway to said header portion, said key track fixture including a plurality of angularly spaced perforations at least partially defining tabs which may be selectively removed to create radially outwardly extending axial keyways, wherein at least one tab is removed to create an entryway complementary to said communication end to permit reception in said receptacle.

11. The filter system of claim 10, wherein said key track fixture comprises a flat metal ring having a top surface and a bottom surface, said perforations extending from said top surface toward said bottom surface and said key track fixture is mounted within said receptacle with said bottom surface facing axially away from said header portion.

12. The filter base module of claim 11, wherein said base module is a molded plastic component and said key track fixture is captured and held within said molded plastic component.

13. The filter base module of claim 10, wherein said key track fixture is a flat metal split ring, installable in an interior circumferential groove in said receptacle.

* * * * *